United States Patent [19]

Jones et al.

[11] 4,339,199
[45] Jul. 13, 1982

[54] PULSED LASER BEAM INTENSITY MONITOR

[75] Inventors: Robert W. Jones; Charles M. Cason, both of Huntsville, Ala.

[73] Assignee: The United States of America as represented by the Secretary of the Army, Washington, D.C.

[21] Appl. No.: 166,872

[22] Filed: Jul. 7, 1980

[51] Int. Cl.³ .............................................. G01J 1/00
[52] U.S. Cl. .................................... 356/213; 350/354; 356/33; 356/35.5; 356/360; 356/361
[58] Field of Search .................. 356/33, 34, 35.5, 360, 356/361, 362, 371, 213, 432, 445; 350/354

[56] References Cited

U.S. PATENT DOCUMENTS

| | | | |
|---|---|---|---|
| 2,655,074 | 10/1953 | Eckert et al. | 356/362 |
| 3,096,388 | 2/1963 | Davenport | 356/33 |
| 3,469,087 | 9/1969 | Seaton | 324/56 |
| 3,811,782 | 5/1974 | Kerr | 356/432 |
| 4,046,477 | 9/1977 | Kaule | 356/35.5 |
| 4,222,669 | 9/1980 | Frosch et al. | 356/360 |

OTHER PUBLICATIONS

Herrman et al., "Trace Analysis in Gases by Laser-Induced Schlieren Technique", *IBM Technical Disclosure Bulletin*, vol. 21, No. 10 (Mar. 1979), pp. 4208–4209.
Hordvik et al., "Photoacoustic Measurements of Surface and Bulk Absorption in HF/DF Laser Window Materials", *Applied Optics*, vol. 16, No. 11, (Nov. 1977) pp. 2919–2924.
Narasimhamurty, *Photoelastic and Electro-Optic Properties of Crystals*, Plenum Press, New York ©1981, p. 287.

*Primary Examiner*—R. A. Rosenberger
*Attorney, Agent, or Firm*—Nathan Edelberg; Robert P. Gibson; Freddie M. Bush

[57] ABSTRACT

A pulsed laser beam intensity monitor measures the peak power within a selectable cross section of a test laser beam and measures integrated energy of the beam during the pulse period of a test laser. A continuous wave laser and a pulsed ruby laser are coaxially arranged for simultaneously transmitting optical output energy through a crystal flat during the time a test laser pulse is transmitted through the flat. Due to stress birefringence in the crystal, the ruby laser pulse transmitted through the flat is recorded and analyzed to provide peak power information about the test laser output pulse, and the continuous wave laser output reflected from the crystal flat provides a measurement of energy during the test laser pulse.

3 Claims, 2 Drawing Figures

PULSED LASER BEAM INTENSITY MONITOR

The invention described herein may be manufactured, used, and licensed by or for the Government for governmental purposes without the payment to us of any royalties thereon.

BACKGROUND OF THE INVENTION

High power pulsed lasers operate with output pulses of energy of various lengths or time duration. Typically the high powered pulsed $CO_2$ laser operates with pulses in the region of 1–5 microseconds. Spatial variation in the output laser pulse occurs throughout the pulse for incremental changes of time during the life time of the pulse. It is desirable to have a detector which measures the peak power within a selectable cross section of the laser beam during the pulse period. It is also desirable to have a detector which measures integrated energy during the duration of the pulse in the beam.

SUMMARY OF THE INVENTION

A pulsed laser beam intensity monitor measures the intensity of a pulsed laser beam at arbitrary points or cross sections within the beam. The intensity monitor measures peak power across the beam of a pulsed test laser. The pulsed test laser beam output is transmitted through a doped crystal flat which is transparent at the output frequency of the laser beam. A helium-neon laser and a pulsed ruby laser are arranged coaxially for simultaneously transmitting through the crystal flat. The reflection of output energy from the helium-neon and pulsed ruby lasers from the crystal surface gives a measurement of energy. The beam transmitted through the crystal flat is analyzed to provide peak power information.

DESCRIPTION OF THE PREFERRED EMBODIMENT

Figure 1:
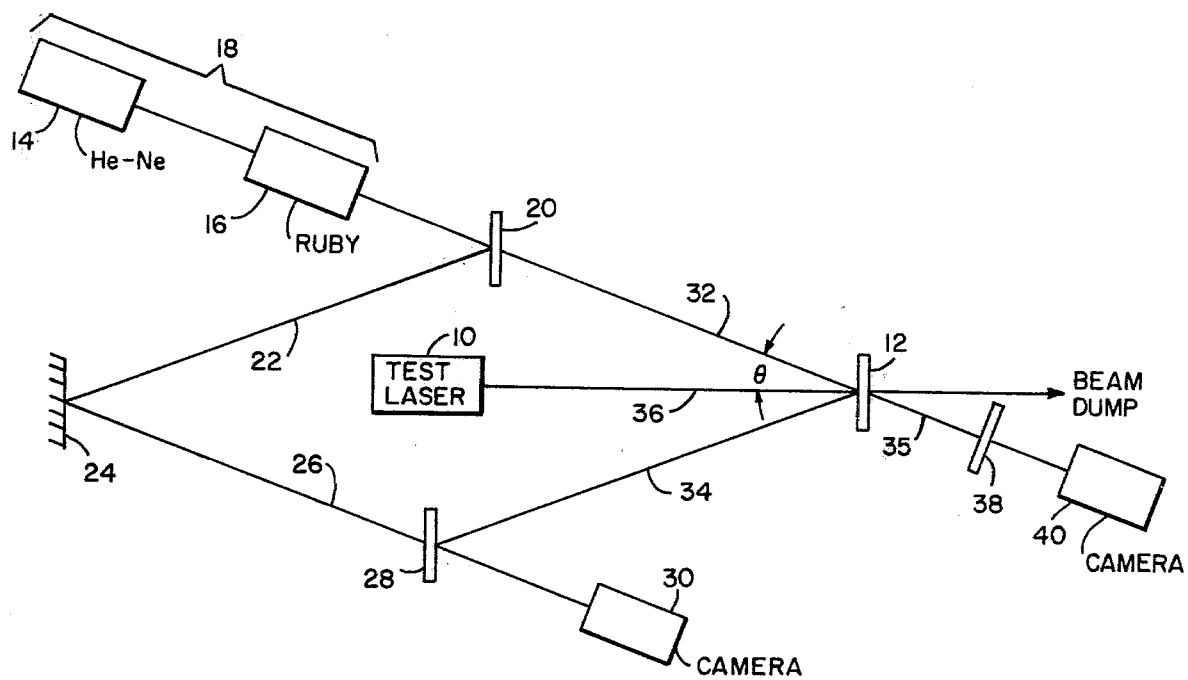
FIG. 1 is a block diagram of a preferred embodiment of the laser beam intensity monitor circuit.

Referring now to the drwings, wherein a preferred embodiment of the laser beam intensity monitor is disclosed, a test laser 10 is disposed substantially coaxially with a doped crystal flat 12. The crystal flat 12 is transparent at the output wave length of the laser 10. A helium-neon laser 14 is disposed coaxially with a ruby laser 16 for directing laser output energy toward crystal 12 at an angle $\theta$ with respect to the normal to the crystal, or the optical path from the test laser to the crystal. The small angle $\theta$ is variable over a large range and is not critical in adjustment. Angle $\theta$ may, typically, be as large as 45 degrees, the critical lower limit being only that it be large enough to allow interferometer paths to be readily established. Helium-neon laser 14 is a continuous wave analyzing and alignment laser which allows measuring whole pulse time integrated spatial power distribution of the test laser. Ruby laser 16 is a pulsed analyzing laser which measures energy for a given incremental time within a pulse period of the test laser. Lasers 14 and 16 function compositely as a probe laser 18 providing an output to beamsplitter 20. Beamsplitter 20 reflects a portion of the incident energy along a path 22 where it is reflected from a mirror 24 along path 26 through a beamsplitter 28 and into camera 30. This path provides the reference beam path of an interferometer. The probe laser 18 output coupled through beamsplitter 20 is directed along path 32 where it impinges upon crystal 12 and a portion of the optical energy is reflected along path 34 to beamsplitter 28 where it is reflected into camera 30 providing the analyzing beam path for an interferometer. The length of path 22 and 26 are substantially equal to paths 34 and 32. Energy from path 32 which is coupled through crystal 12 passes through a polarizer 38 and into camera 40.

Figure 2:
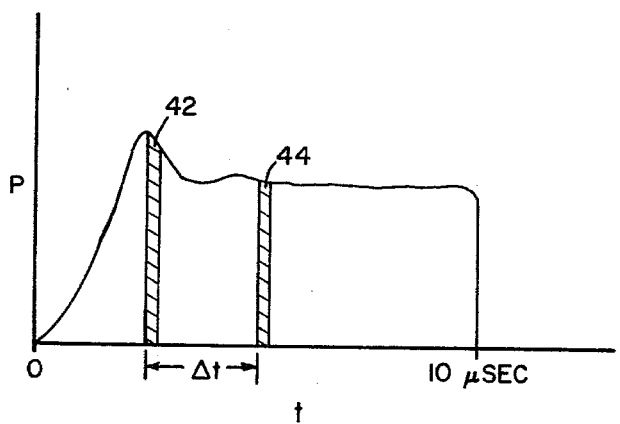
FIG. 2 is a typical pulse of output laser power which can be measured by the monitor system of FIG. 1.

FIG. 2 is a typical test laser output pulse of energy, with time being the horizontal and power being the vertical coordinates, a typical output pulse of energy 10 microseconds in length is shown for a test laser. Within the pulse two cross sections of the beam 42 and 44 are shown having a typical time period of approximately 20 nanoseconds and separated by some increment of time $\Delta t$.

In a typical embodiment the test laser may be a $CO_2$ laser having an output at 10.6 microns and a pulse length of 10 microseconds. Other lasers of longer or shorter pulse lengths and wavelengths may also be tested but they should exceed the output period of the ruby laser 16, which is approximately 20 nanoseconds, if reasonable spatial variation are to be determined for the test laser. For the $CO_2$ laser the doped crystal flat 12 is transparent at 10.6 microns and visable wavelengths. A high energy output from $CO_2$ laser 10 is directed along path 36 and is incident upon the transparent crystal 12. The doped material on crystal 12 absorbs a portion of the $CO_2$ beam. The crystal has an isotropic crystalline structure. Typically, for electric lasers, such as XeF or XeCl, the flat could be quartz, for $CO_2$ lasers the flat may be zinc selenide, and for chemical lasers, calcium fluoride can function satisfactorily as an undoped flat. Doping requirements are dependent on the power of the laser being analyzed. A portion of the $CO_2$ laser beam passing through the crystal is absorbed, resulting in internal stress within the crystalline structure. This produces stress birefringence. This stress is unequal across the face or surface of the crystal where the beam from the test laser is incident, depending on the power distribution within the beam.

Simultaneously with the test laser output pulse, the pulsed ruby and helium-neon laser beams, aligned coaxially, are incident upon the transparent crystal 12. Both beams of lasers 14 and 16 are plane polarized. Two beams will result from the beam path 32, a reflected beam along path 34 and a transmitted beam along path 35.

The reflected beam along path 34 from the helium-neon laser is combined in camera 30 with the reference beam from path 26 forming an interferogram and is analyzed to determine integrated energy within the $CO_2$ pulse. The interferogram formed by the interferometer and recorded on the film of camera 30 measures the surface deviations of the doped crystal from heating. The helium-neon laser 14 provides a continuous wave output which overlaps the output pulse of the test laser allowing the energy to be integrated during the duration of the test laser pulse in the beam.

The energy from path 32 which is passed through crystal 12 along path 35 is analyzed with a crossed polarized sheet 38. The pulsed ruby laser output is the source for data in this part of the intensity monitor circuit and provides an illumination time of 20 nanoseconds within the period of duration of the output $CO_2$ laser pulse. The pattern is recorded on film by camera 40 and provides a measurement of peak power.

Since the ruby laser 16 output pulses are approximately 20 nanoseconds in length which is short compared to the test laser output pulses the ruby laser output pulse may be timed or switched to occur selectably at intervals throughout the length of the test laser pulse (as shown at sections 42 and 44 of FIG. 2) and thereby measure spatial variation selectively within the output pulse of the test laser and thereby determine variation of output intensity per unit area of cross section of the beam.

Since the test laser will repeatedly provide an identical output pulse for successive pulses, the birefringence stress of the crystalline structure of flat 12 will also vary in a repetative manner according to variation in the test laser output pulse with stronger parts of the laser beam output and weaker parts of the test laser beam output affecting the same portion of the flat each time the output pulse is incident thereon. Thus by varying the time period of the 20 nanosecond pulse within the pulse period of the test laser, the stronger and weaker areas of birefringence stress will accordingly transmit stronger or weaker portions of the ruby laser output occuring during that overlapping time interval to provide a cross sectional peak power monitor or measurement of the test laser beam. During the time that there is no test laser output pulse, there is no stress buildup in the crystal, and any heliumneon or ruby laser output measured during this time will produce a consistant or uniform background signal indicative only of the energy in these lasers.

Where the test laser is a continuous wave (cw) laser, cameras 30 and 40 may be motion picture cameras allowing the function of the ruby laser to be accomplished by the cameras. Thus, the ruby laser 16 is omitted for cw laser testing and the He-Ne laser 14 alone serves as the probe laser.

Although a particular embodiment and form of this invention has been illustrated, it will be obvious to those skilled in the art that modifications may be made without departing from the scope and spirit of the foregoing disclosure. Therefore, it is understood that the invention is limited only by the claims appended hereto.

We claim:

1. A laser beam intensity monitor for measuring the intensity of a laser pulse at arbitrary points within said pulse, comprising: a crystal flat for receiving said laser pulse normal to the surface thereof, a first laser adapted for directing optical energy towards said flat at an angle of incidence different from the normal thereto, a second laser arranged coaxially with said first laser for providing output optical energy toward said flat, a first camera, a first beam splitter disposed for directing a portion of said first and second laser outputs along a reference path, and a second portion along a second path to said crystal flat, a second beam splitter disposed for combining optical energy from said first and second lasers reflected from said crystal flat with optical energy from said reference path and directing said combined optical energy to said first camera, a polarized and a second camera coaxially aligned with the outputs of said first and second lasers for receiving optical energy coupled through the crystal flat, said crystal flat being a doped isotropic crystalline structure exhibiting stress birefringence in response to laser pulses passing through the material, and wherein said first laser is a continuous wave laser and said second laser is a pulsed laser.

2. A laser beam intensity monitor as set forth in claim 1 wherein said first laser is a heliumneon laser, and said second laser is a ruby laser.

3. A laser beam intensity monitor as set forth in claim 2 and further comprising a test laser disposed for directing pulses of laser energy normal to the surface of said crystal flat for generating stress within said flat, and wherein said ruby laser output pulses have a time duration less than that of the test laser for responding to said birefringence stress generated within said crystal flat, said first and second lasers being adapted for providing respective output during the time the test laser output is impinging on said flat.

* * * * *